United States Patent
Nagai et al.

(10) Patent No.: US 11,932,233 B2
(45) Date of Patent: Mar. 19, 2024

(54) MOTOR CONTROLLER

(71) Applicant: TOYOTA JIDOSHA KABUSHIKI KAISHA, Toyota (JP)

(72) Inventors: Shingo Nagai, Toyota (JP); Naoto Koshino, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 324 days.

(21) Appl. No.: 17/647,243

(22) Filed: Jan. 6, 2022

(65) Prior Publication Data

US 2022/0212652 A1    Jul. 7, 2022

(30) Foreign Application Priority Data

Jan. 7, 2021   (JP) ................................ 2021-001489

(51) Int. Cl.
  *B60W 20/13*   (2016.01)
  *B60L 58/13*   (2019.01)
  *B60L 58/24*   (2019.01)

(52) U.S. Cl.
  CPC ............ *B60W 20/13* (2016.01); *B60L 58/13* (2019.02); *B60L 58/24* (2019.02); *B60W 2510/246* (2013.01); *B60W 2555/00* (2020.02)

(58) Field of Classification Search
  None
  See application file for complete search history.

(56) References Cited

U.S. PATENT DOCUMENTS

| | | | | |
|---|---|---|---|---|
| 9,784,793 | B2* | 10/2017 | Lampe | H02K 11/20 |
| 9,797,955 | B2* | 10/2017 | Okada | G01R 31/12 |
| 11,411,426 | B2* | 8/2022 | Ono | B60R 16/03 |
| 2008/0315705 | A1* | 12/2008 | Obata | B60L 50/61 |
| | | | | 903/906 |
| 2009/0198439 | A1* | 8/2009 | Ochiai | B60W 20/50 |
| | | | | 701/112 |
| 2013/0033214 | A1* | 2/2013 | Obata | G01R 31/1227 |
| | | | | 324/765.01 |
| 2014/0139150 | A1* | 5/2014 | Morisaki | B60L 50/61 |
| | | | | 318/139 |
| 2014/0241011 | A1* | 8/2014 | Nomura | H02M 3/155 |
| | | | | 363/13 |
| 2016/0082841 | A1* | 3/2016 | Aoki | B60L 3/12 |
| | | | | 701/22 |
| 2017/0126086 | A1* | 5/2017 | Nagai | H02K 1/146 |
| 2020/0036268 | A1 | 1/2020 | Azusawa et al. | |
| 2020/0099267 | A1* | 3/2020 | Fujieda | H02K 3/12 |
| 2020/0262310 | A1* | 8/2020 | Ono | H02J 7/007194 |

(Continued)

FOREIGN PATENT DOCUMENTS

| | | |
|---|---|---|
| JP | 2006288170 A | 10/2006 |
| JP | 2020018067 A | 1/2020 |

*Primary Examiner* — Jonathan M Dager
(74) *Attorney, Agent, or Firm* — Hunton Andrews Kurth LLP

(57) ABSTRACT

A motor controller for controlling a motor that is driven with electric power from a battery includes an atmospheric pressure sensor, and a coil temperature sensor. The motor controller is configured to determine an upper limit state of charge of the battery, and lower the upper limit state of charge of the battery in response to the atmospheric pressure being a predetermined pressure or lower or in response to the coil temperature being a predetermined temperature or higher.

2 Claims, 8 Drawing Sheets

(56) References Cited

U.S. PATENT DOCUMENTS

| | | | |
|---|---|---|---|
| 2022/0209631 A1* | 6/2022 | Nagai | H02P 29/64 |
| 2022/0302014 A1* | 9/2022 | Cole | H01L 23/5286 |
| 2022/0337102 A1* | 10/2022 | Kim | H02K 1/16 |
| 2023/0327596 A1* | 10/2023 | Nishimura | H02M 7/537 |

* cited by examiner

MOTOR CONTROLLER

CROSS REFERENCE TO RELATED APPLICATION

This application claims priority to Japanese Patent Application No. 2021-001489 filed on Jan. 7, 2021, which is incorporated herein by reference in its entirety including the specification, claims, drawings, and abstract.

TECHNICAL FIELD

The present disclosure relates to a motor controller for protecting an insulation coating of a motor coil.

BACKGROUND

Electric vehicles, for example, include a motor. When a voltage applied to a motor exceeds a predetermined voltage (partial discharge inception voltage), partial discharge occurs in an insulation coating of a motor coil, resulting in deterioration of the insulation performance of the insulation coating and shortening of the life of the motor. As the partial discharge inception voltage depends on the atmospheric pressure and the coil temperature, the partial discharge inception voltage is lower when an electric vehicle travels in highlands rather than in lowlands, for example, which makes the insulation performance prone to deterioration.

JP 2020-018067 A discloses a motor controller that reduces, with a boost converter, a voltage applied to the motor exceeding the partial discharge inception voltage, to thereby prevent deterioration of the insulation performance of an insulation coating of the motor and avoid shortening of the life of the motor.

SUMMARY

Some electric vehicles, however, may include no such boost converters. Further, a boost converter, and a booster circuit forming a boost converter are expensive and therefore raise the costs for components.

An embodiment of the disclosure is therefore directed to providing a motor controller that prevents a voltage to be applied to a motor from exceeding a partial discharge inception voltage without a boost converter when the atmospheric pressure decreases or the coil temperature of the motor rises.

In accordance with one aspect of the disclosure, a motor controller for controlling a motor that is driven with an electric power from a battery includes an electronic control unit (ECU), an atmospheric pressure sensor configured to detect an atmospheric pressure, and a coil temperature sensor configured to detect a coil temperature of the motor. The ECU is configured to determine an upper limit state of charge of the battery, and lower the upper limit state of charge of the battery in response to the atmospheric pressure detected by the atmospheric pressure sensor being a predetermined pressure or lower or in response to the coil temperature detected by the coil temperature sensor being a predetermined temperature or higher.

In the motor control apparatus, the ECU may lower the upper limit state of charge of the battery stepwise in accordance with a reduction in the atmospheric pressure or a rise in the coil temperature, in response to the atmospheric pressure being the predetermined pressure or lower or in response to the coil temperature being the predetermined temperature or higher.

The motor controller of the disclosure enables prevention of the voltage to be applied to a motor from exceeding the partial discharge inception voltage without a boost converter, by reducing the upper limit state of charge of a battery to lower the voltage to be applied to the motor, when the atmospheric pressure decreases or the coil temperature of the motor rises.

BRIEF DESCRIPTION OF DRAWINGS

An embodiment of the present disclosure will be described by reference to the following figures, wherein.

DESCRIPTION OF EMBODIMENTS

An embodiment of the disclosure will be described in detail below. In the following description, specific shapes, materials, directions, and numeral values, for example, are only examples to facilitate understanding of the disclosure, and may be modified as appropriate in accordance with use, object, and specifications, for example.

Figure 1:
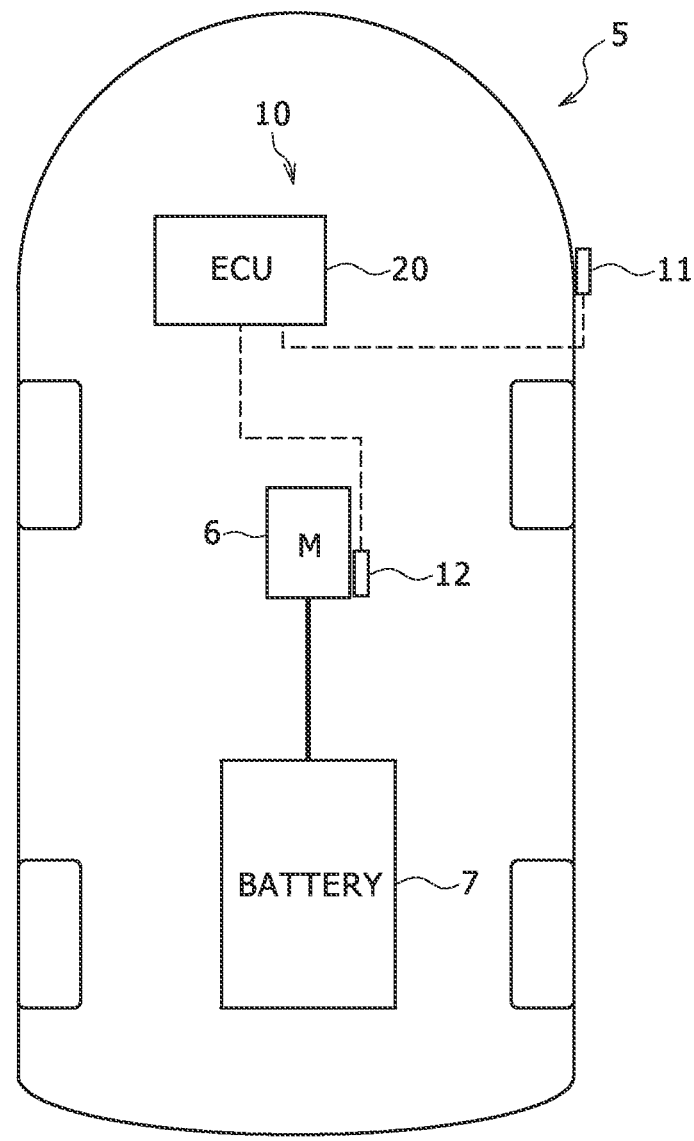
FIG. 1 schematically illustrates a vehicle including a motor controller according an embodiment.

Referring to FIG. 1, a vehicle 5 including a motor controller 10 according to an embodiment will be described. FIG. 1 schematically illustrates the vehicle 5.

As illustrated in FIG. 1, the motor controller 10 is disposed in the vehicle 5, and includes an Electronic Control Unit (ECU) 20 as a processor that performs various types of data processing. The vehicle 5 in this example is an electric vehicle that travels with power of a motor 6 driven with electric power supplied from a battery 7. The vehicle 5 may be a hybrid electric vehicle.

The motor controller 10 performs protection control for an insulation coating of a coil of the motor 6, as will be described below. When the atmospheric pressure lowers or the coil temperature of the motor 6 rises, the motor controller 10 reduces the upper limit of the state of charge of the battery 7 to decrease the voltage to be applied to the motor 6, thereby preventing the applied voltage from exceeding the partial discharge inception voltage. This configuration avoids deterioration of the insulation performance of the insulation coating without a boost converter.

The motor controller 10 includes an atmospheric pressure sensor 11 for detecting the atmospheric pressure and a coil temperature sensor 12 for detecting the coil temperature of the motor 6.

Figure 2:
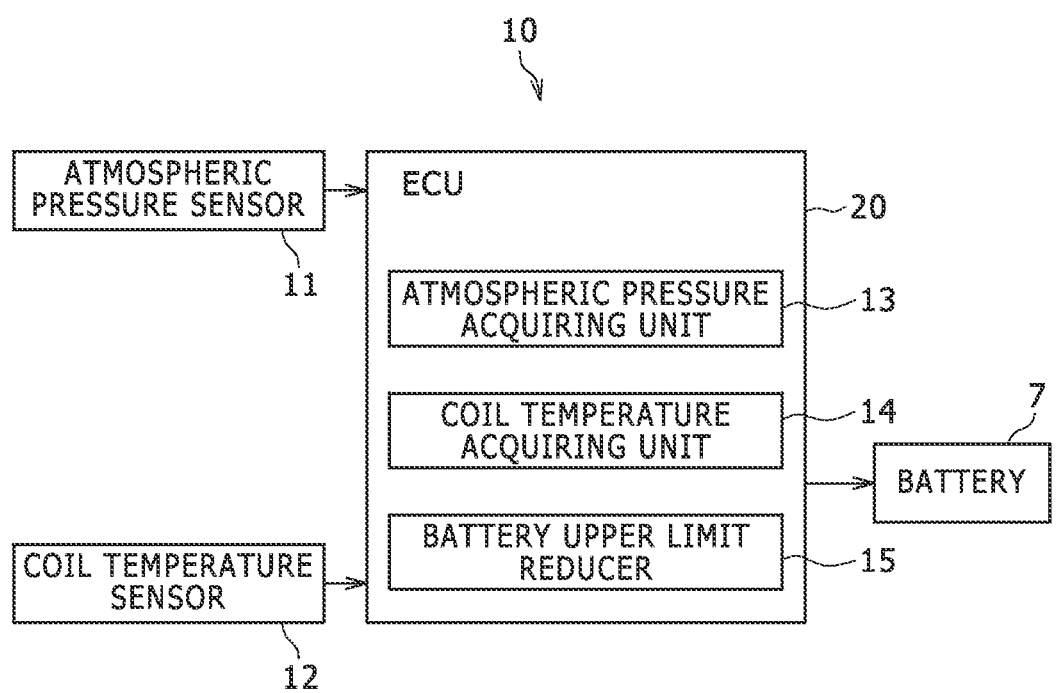
FIG. 2 is a block diagram illustrating a configuration of the motor controller.
Figure 3:
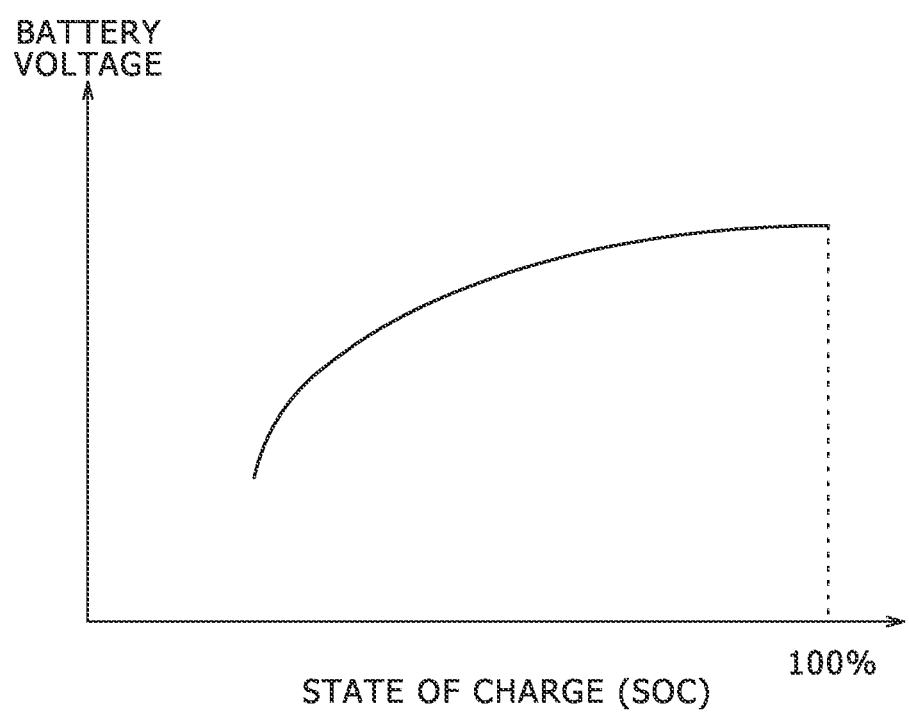
FIG. 3 is a graph illustrating a correlation between a battery voltage and a state of charge of a battery.
Figure 4:
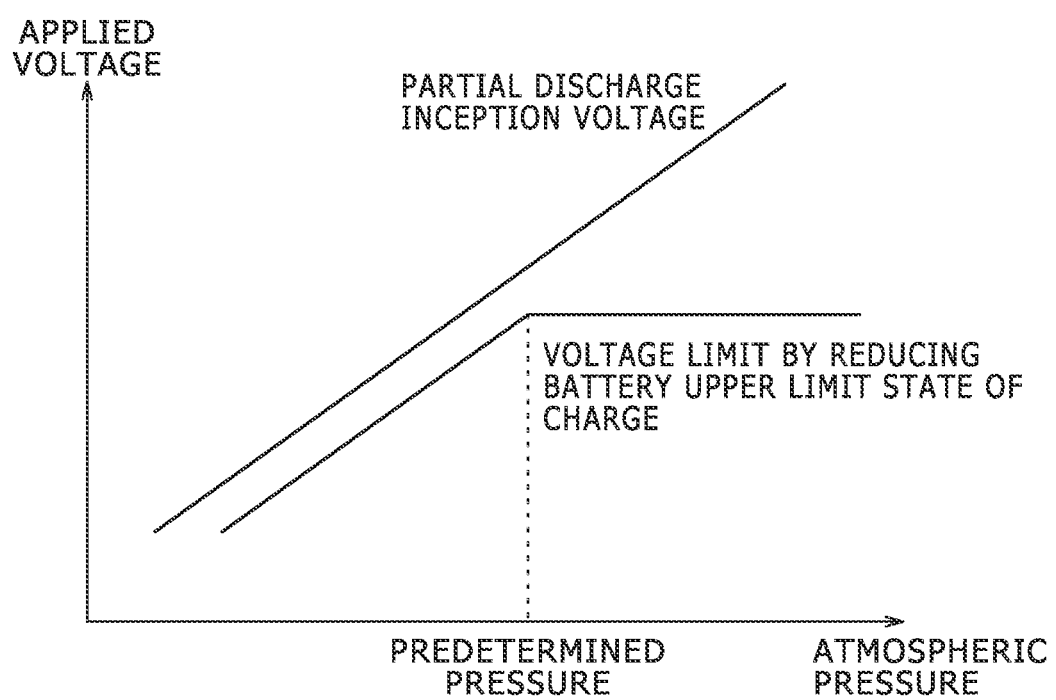
FIG. 4 is a graph illustrating a partial discharge inception voltage and a voltage limit of a battery and a correlation between the voltage applied to a motor and the atmospheric pressure for each property.
Figure 5:
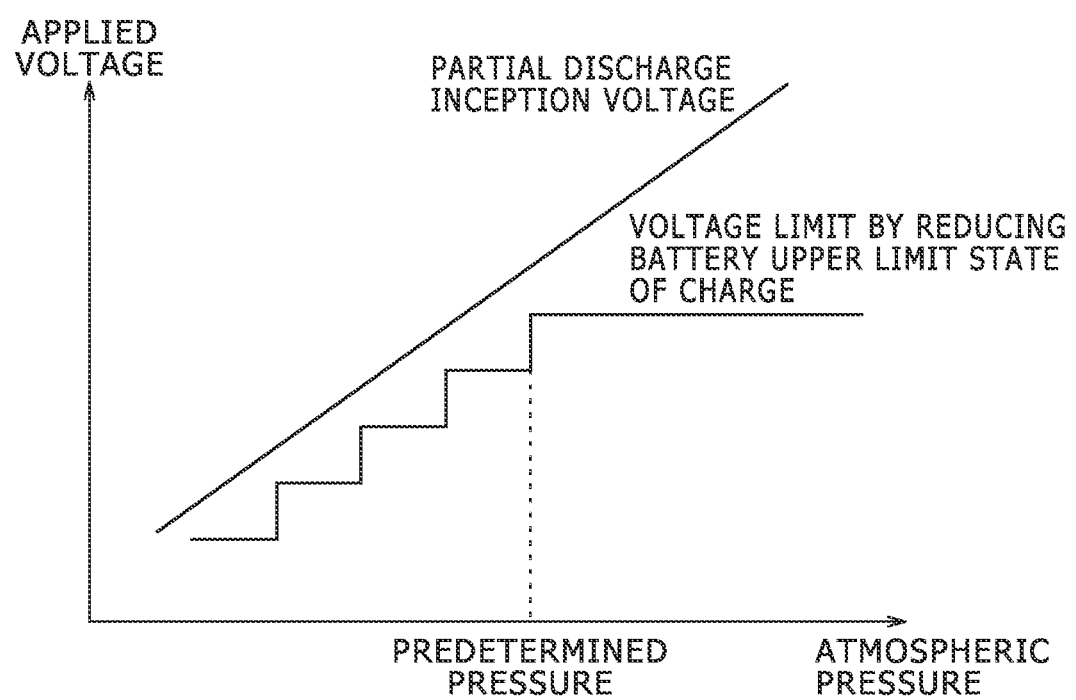
FIG. 5 is a further graph illustrating a partial discharge inception voltage and a voltage limit of a battery and a correlation between the voltage applied to a motor and the atmospheric pressure for each property.
Figure 6:
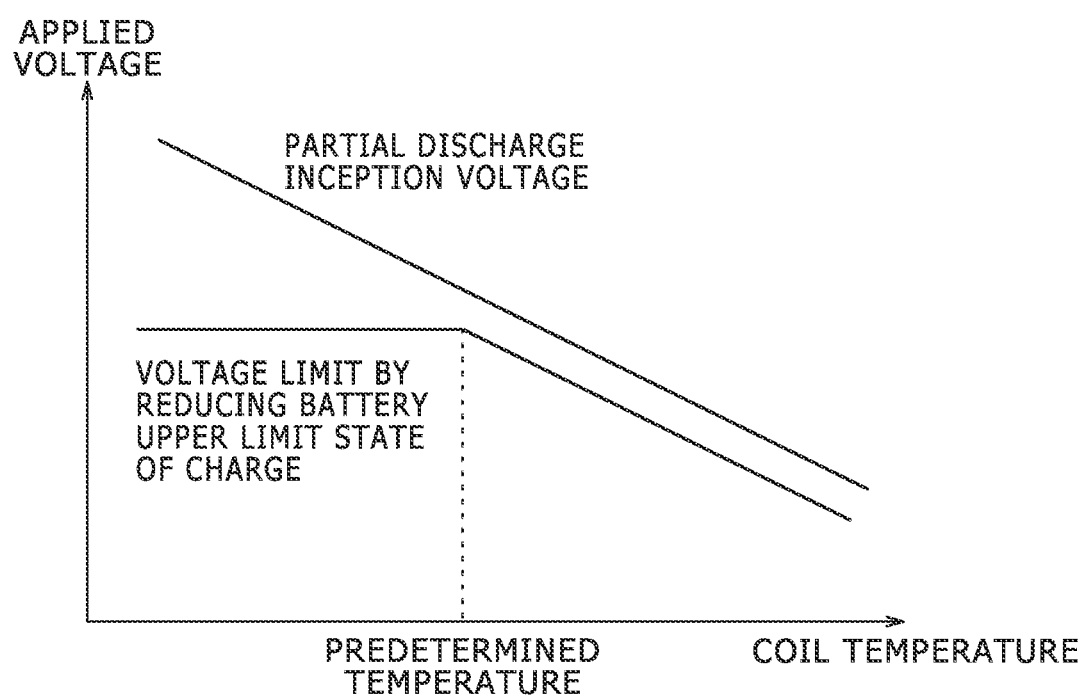
FIG. 6 is a graph illustrating a partial discharge inception voltage and a voltage limit of a battery and a correlation between the voltage applied to a motor and the coil temperature for each property.
Figure 7:
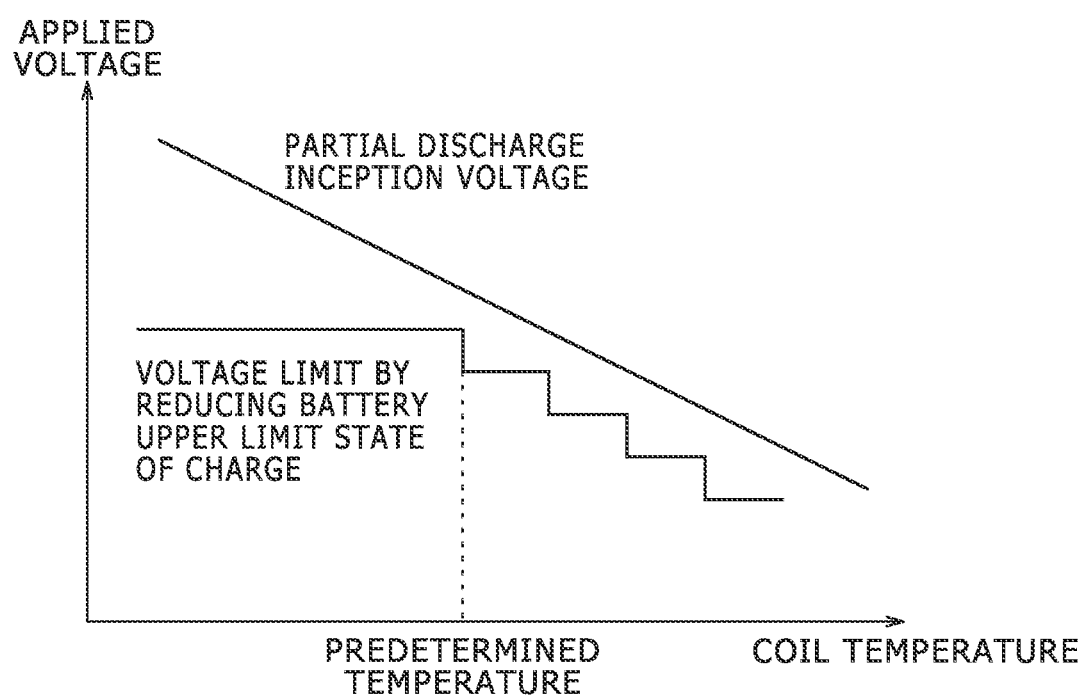
FIG. 7 is a further graph illustrating a partial discharge inception voltage and a voltage limit of a battery and a correlation between the voltage applied to a motor and the coil temperature for each property.

Referring to FIG. 2 to FIG. 7, the configuration of the motor controller 10 will be described. FIG. 2 is a block diagram illustrating the configuration of the motor controller 10. FIG. 3 is a graph illustrating a correlation between the battery voltage and the state of charge of the battery 7. FIG. 4 is a graph illustrating the partial discharge inception voltage and the voltage limit of the battery 7 and illustrating a correlation between the voltage applied to the motor 6 and the atmospheric pressure for each property. FIG. 5 is a further graph illustrating the partial discharge inception voltage and the voltage limit of the battery 7 and illustrating a correlation between the voltage applied to the motor 6 and the atmospheric pressure for each property. FIG. 6 is a graph illustrating the partial discharge inception voltage and the voltage limit of the battery 7 and illustrating a correlation between the voltage applied to the motor 6 and the coil temperature for each property. FIG. 7 is a further graph illustrating the partial discharge inception voltage and the voltage limit of the battery 7 and illustrating a correlation between the voltage applied to the motor 6 and the coil temperature for each property.

The ECU 20 includes a Central Processing Unit (CPU) or an operation processing unit, and a memory unit such as Random Access Memory (RAM) and Read Only Memory (ROM), and performs signal processing according to a program prestored in the ROM while performing a temporary memory function of the RAM.

As illustrated in FIG. 2, the ECU 20 is connected with the atmospheric pressure sensor 11 and the coil temperature sensor 12, for example, to receive signals transmitted from these sensors. The motor controller 10 is further connected with the battery 7 to transmit signals to the battery 7.

The ECU 20 includes an atmospheric pressure acquiring unit 13 that acquires the atmospheric pressure detected by the atmospheric pressure sensor 11, a coil temperature acquiring unit 14 that acquires the coil temperature of the motor 6 detected by the coil temperature sensor 12, and a battery upper limit state of charge reducer 15 that reduces the upper limit state of charge of the battery 7, which will be hereinafter referred simply as a "battery upper limit reducer".

The battery upper limit reducer 15 lowers the upper limit of the state of charge of the battery 7 when the atmospheric pressure is a predetermined pressure or lower based on the atmospheric pressure acquired by the atmospheric pressure acquiring unit 13 or when the coil temperature is a predetermined temperature or higher based on the coil temperature acquired by the coil temperature acquiring unit 14.

The upper limit state of charge of the battery 7 is an upper limit of the state of charge of the battery 7 that has been preset. The state of charge of the battery 7 refers to a rate of the remaining amount of electricity of the battery 7 excluding an amount of discharged electricity from the amount of electricity of the battery 7 in a fully charged state. As illustrated in FIG. 3, the lower the state of charge of the battery 7, the lower the voltage of the battery 7, and the voltage to be applied to the motor 6 would also decrease.

FIG. 4 illustrates the partial discharge inception voltage and the voltage limit of the battery 7 and illustrates a correlation between the applied voltage to the motor 6 and the atmospheric pressure for each property. Partial discharge occurs in the insulation coating of the coil of the motor 6 when a voltage equal to or greater than a predetermined voltage is applied to the motor 6; the partial discharge inception voltage refers to the predetermined voltage. Partial discharge that occurs in the insulation coating of the coil would deteriorate the insulation performance of the insulation coating to shorten the life of the motor 6. As shown in FIG. 4, the partial discharge inception voltage decreases with a reduction in the atmospheric pressure. When the vehicle 5 travels in highlands, for example, the partial discharge inception voltage is lower than in lowlands, and the insulation performance is prone to deterioration.

As illustrated in FIG. 4, when the atmospheric pressure is a predetermined pressure or lower, the battery upper limit reducer 15 lowers the upper limit state of charge of the battery 7, which further leads to limiting and reducing the voltage of the battery 7, thereby lowering the applied voltage to the motor 6. Such a reduction in the applied voltage to the motor 6 results in prevention of the applied voltage to the motor 6 from exceeding the partial discharge inception voltage when the atmospheric pressure lowers while the vehicle 5 is travelling in highlands, for example. This configuration avoids deterioration of the insulation performance of the insulation coating without a boost converter.

As illustrated in FIG. 5, when the atmospheric pressure is the predetermined pressure or lower, the battery upper limit state of charge reducer 15 may lower the upper limit state of charge of the battery 7 stepwise. This configuration reduces the voltage of the battery 7 stepwise to thereby reduce the applied voltage to the motor 6 stepwise. This configuration can also achieve advantages similar to those described above.

FIG. 6 illustrates the partial discharge inception voltage and the voltage limit of the battery 7, and a correlation between the voltage applied to the motor 6 and the coil temperature for each property. As illustrated in FIG. 6, the partial discharge inception voltage lowers with a rise in the coil temperature.

As illustrated in FIG. 6, when the coil temperature is a predetermined temperature or higher, the battery upper limit reducer 15 lowers the upper limit state of charge of the battery 7 for limiting or reducing the voltage of the battery 7 and thus reducing the applied voltage to the motor 6. This configuration reduces the applied voltage to the motor 6 when the coil temperature rises, thereby preventing the applied voltage to the motor 6 from exceeding the partial discharge inception voltage. It is therefore possible to avoid deterioration of the insulation performance of the insulation coating without a boost converter.

As illustrated in FIG. 7, when the coil temperature is a predetermined temperature or higher, the battery upper limit state of charge reducer 15 may lower the upper limit state of charge of the battery 7 stepwise. This configuration reduces the voltage of the battery 7 stepwise to thereby reduce the applied voltage to the motor 6 stepwise. This configuration can also achieve the advantages similar to those described above.

Figure 8:
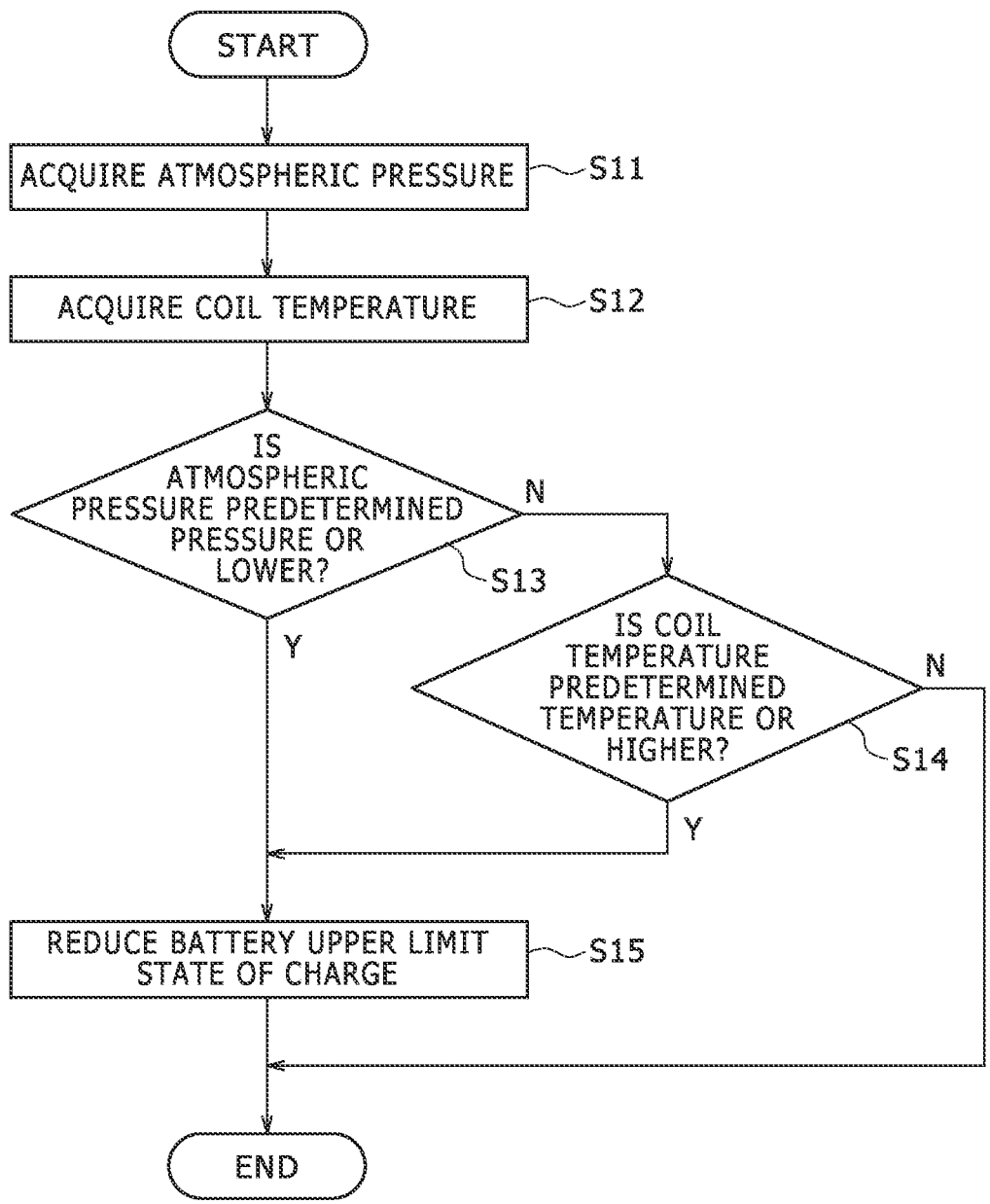
FIG. 8 is a flow chart illustrating a protection control flow for an insulation coating.

Referring now to FIG. 8, a flow of protection control of the insulation coating to be performed by the motor controller 10 will be described. FIG. 8 is a flowchart illustrating a flow of insulation coating protection control.

As illustrate in FIG. 8, in step S11, the atmospheric pressure acquiring unit 13 acquires the atmospheric pressure detected by the atmospheric pressure sensor 11. In step 12, the coil temperature acquiring unit 14 acquires the coil temperature detected by the coil temperature sensor 12.

In step S13, whether the atmospheric pressure acquired in step S11 is the predetermined pressure or less is determined. In response to the atmospheric pressure being the predetermined atmospheric pressure or less, the process proceeds to step S15. Meanwhile, in response to the atmospheric pressure exceeding the predetermined atmospheric pressure in step S13, the process proceeds to step S14. In step S14, a determination is made as to whether the coil temperature acquired in step S12 is the predetermined temperature or higher. In response to the coil temperature being the predetermined temperature or higher, the process proceeds to step S15. In step S15, the battery upper limit reducer 15 lowers the upper limit state of charge of the battery 7.

The present disclosure is not limited to the embodiments described above and their modification examples, and various modifications and improvements may be made within the scope of matters recited in the claims of the present application.

The invention claimed is:

1. A motor controller for controlling a motor that is driven with electric power from a battery, the motor controller comprising:
   an electronic control unit (ECU);
   an atmospheric pressure sensor configured to detect an atmospheric pressure; and
   a coil temperature sensor configured to detect a coil temperature of the motor, wherein
   the ECU is configured to:
      determine an upper limit state of charge of the battery, and
      lower the upper limit state of charge of the battery in response to the atmospheric pressure detected by the atmospheric pressure sensor being a predetermined pressure or lower or in response to the coil temperature detected by the coil temperature sensor being a predetermined temperature or higher.

2. The motor controller according to claim 1, wherein the ECU is configured to lower the upper limit state of charge of the battery stepwise in accordance with a reduction in the atmospheric pressure or a rise in the coil temperature, in response to the atmospheric pressure being the predetermined pressure or lower or in response to the coil temperature being the predetermined temperature or higher.

* * * * *